Figure 5:
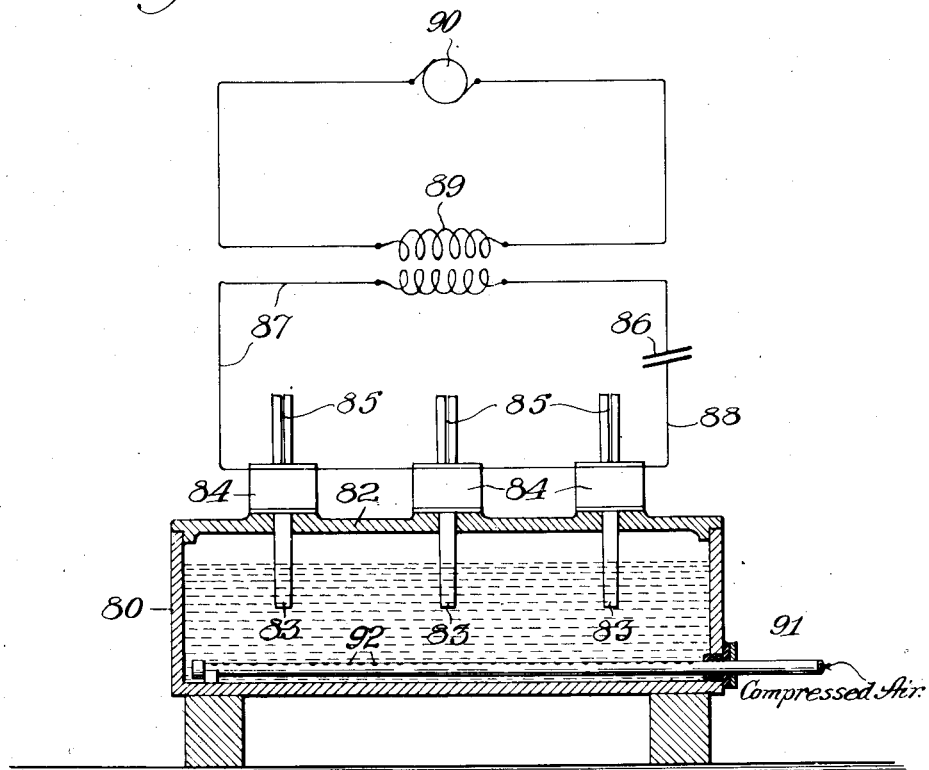

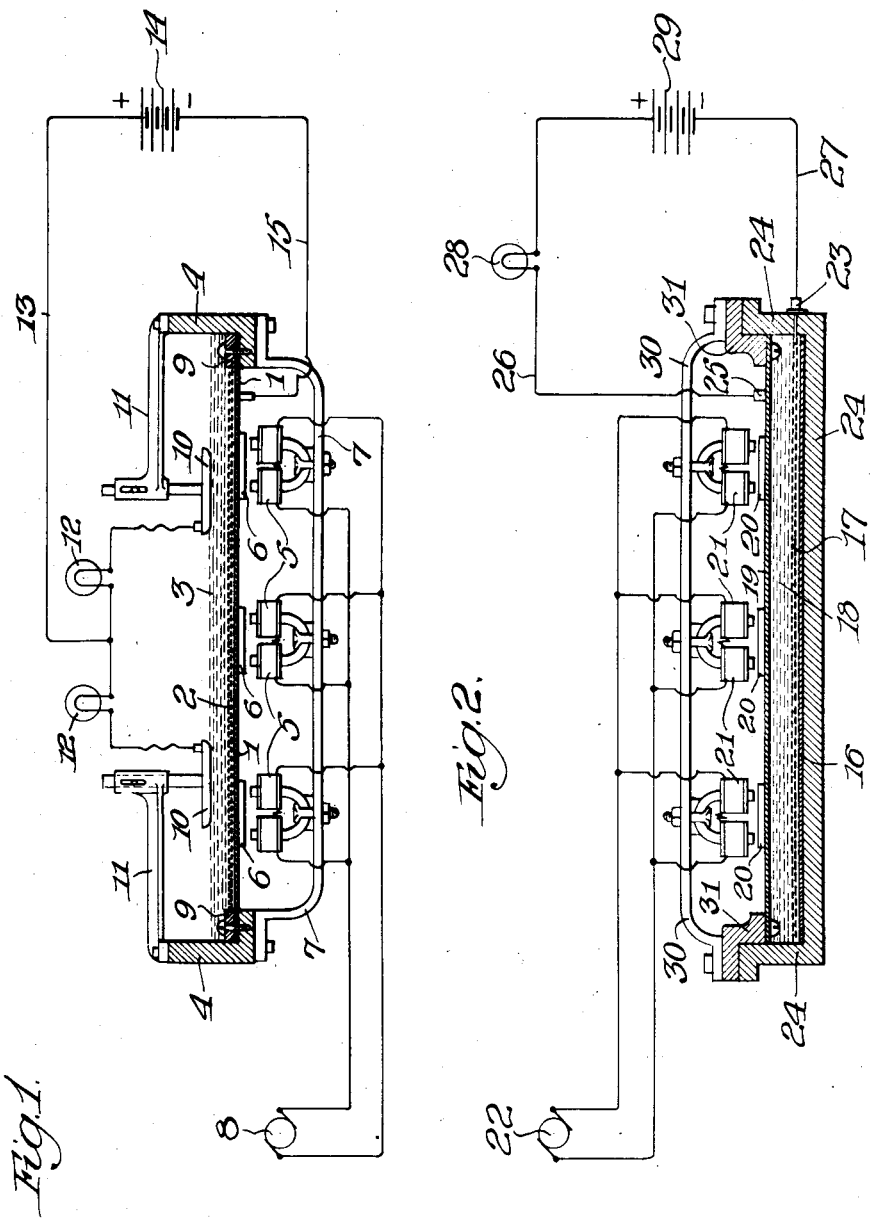

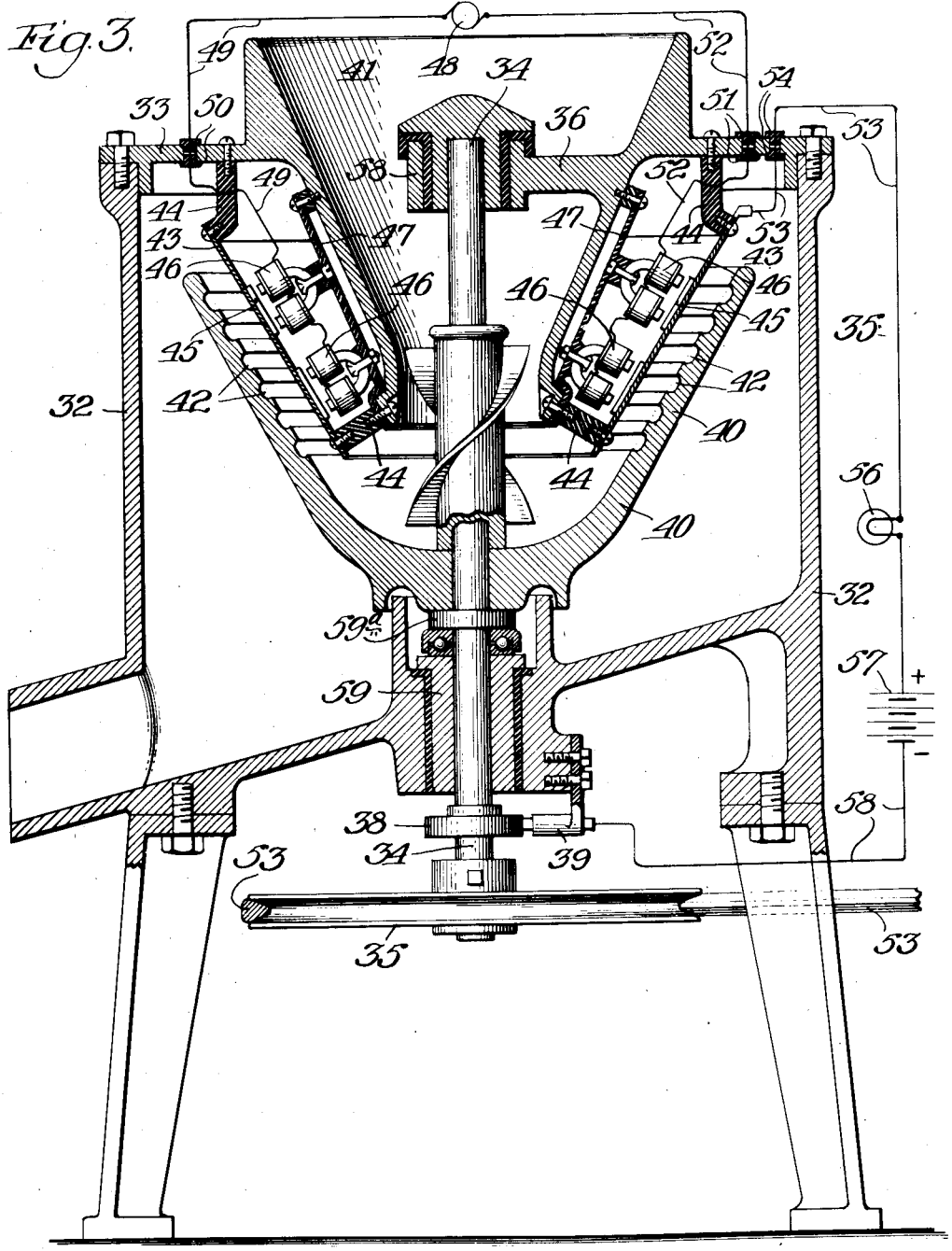

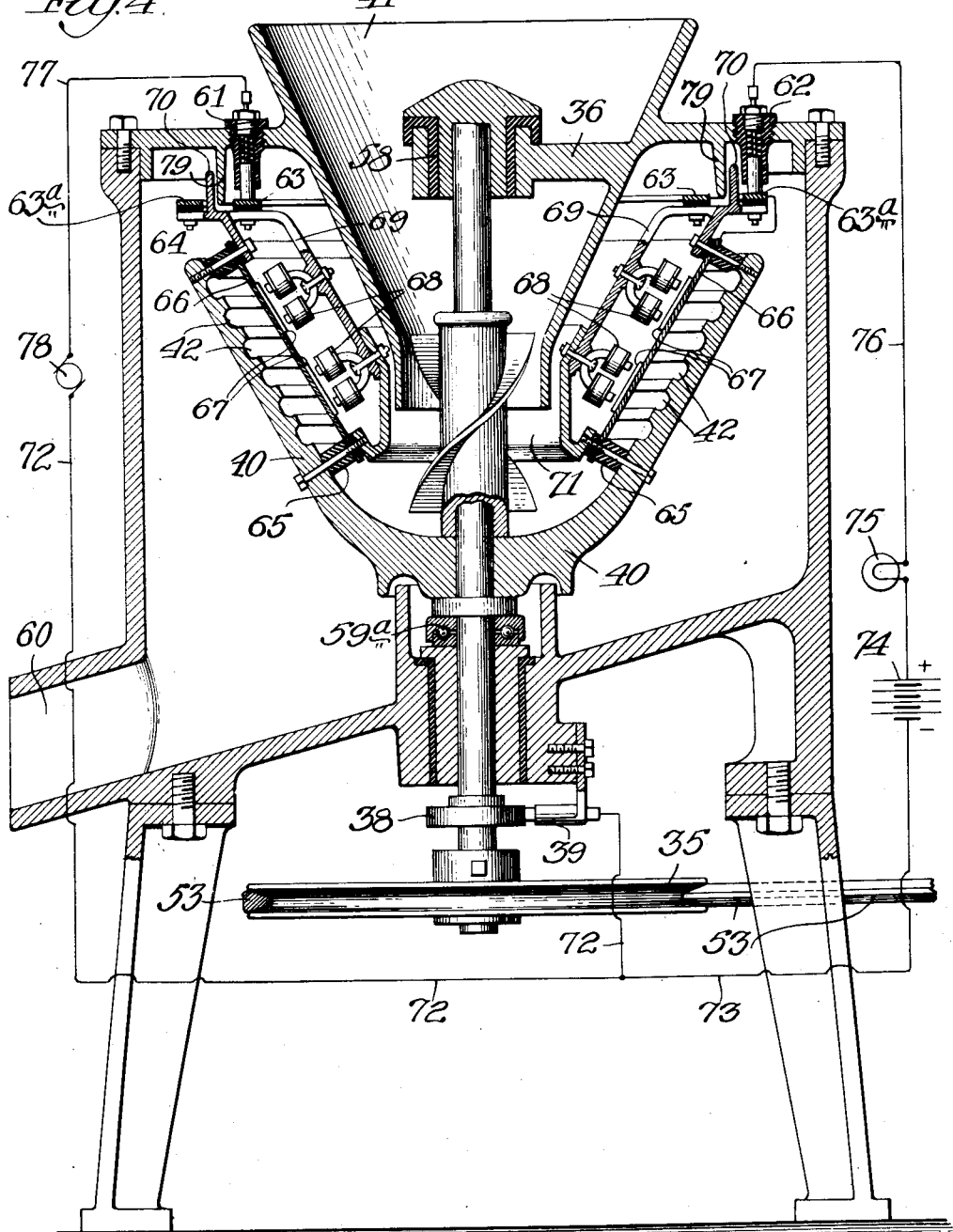

Feb. 16, 1937.   C. R. HOLDEN   2,071,260
APPARATUS FOR THE SEPARATION OF SOLIDS IN LIQUID SUSPENSION
Filed April 13, 1935   4 Sheets-Sheet 4

Inventor:
Charles Revell Holden,
By Dyrenforth, Lee, Chritton & Wiles,
Attys.

Patented Feb. 16, 1937

2,071,260

UNITED STATES PATENT OFFICE 2,071,260

APPARATUS FOR THE SEPARATION OF SOLIDS IN LIQUID SUSPENSION

Charles Revell Holden, Chicago, Ill.

Application April 13, 1935, Serial No. 16,252

2 Claims. (Cl. 209—179)

This invention relates to improvements in process for and apparatus for the separation of solids in liquid suspension, and more particularly to process for and apparatus for the recovery of gold and similar noble metals from an aqueous suspension or pulp of the finely divided ore.

Previously, there have been many attempts to increase the effectiveness of amalgamation processes by the use of a uniform direct current passed through the metalliferous suspension, the mercury amalgamating surface being the cathode or negative pole of the circuit. It has been found that such processes do not recover the more finely divided gold particles and that in such cases, it is necessary to resort to chemical methods of extraction, such as the well-known "cyanide process".

It is an object of this invention to provide simple and effective means for increasing the recovery of finely divided particles of gold in amalgamation processes, and for increasing the rapidity of the reactions involved in chemical processes.

It is a further object of this invention to provide means for increasing the effectiveness of the present well-known extraction processes in such form as to be capable of addition to existing gold extraction devices without necessitating the complete rebuilding or replacement thereof.

Another object of my invention is to provide a novel and practical apparatus for use in carrying out the process described.

Other objects and features of this invention will be apparent upon a reading of the following description of embodiments thereof, in connection with the drawings, in the figures of which the invention is illustrated, together with the appended claims.

For purpose of brevity in the subsequent descriptions, I shall employ the term "acoustic waves" to mean any longitudinal wave motions, consisting of waves of alternate compression and rarefaction, which are propagated through the fluid medium containing the metals to be extracted in suspension, but without any implication that the frequency of these waves is restricted to any particular frequency range, such as that of power frequencies, the audible range or the so-called supersonic range, extending upwards from the limit of audibility, to and including frequencies of the magnitudes employed for radio transmission. In fact, I have found that it is frequently desirable to employ simultaneously or successively a plurality of frequencies of widely differing magnitudes.

The existence of such acoustic waves in the liquid suspension or ore pulp is found to increase the rate and extent of amalgamation in processes utilizing mercury to thus seize and retain the gold to be extracted, and also to accelerate to a substantial degree the reactions of the chemical processes, whereby these reactions are caused to run to a higher degree of completion. In amalgamation processes, the use of acoustic waves of relatively low frequencies is also of assistance in preventing the accumulation of black sands which tend to clog the mercury surfaces at which amalgamation takes place.

Figure 1 of the drawings illustrates the application of acoustic waves to promote amalgamation in the type of apparatus where the metalliferous liquid suspension is caused to flow across amalgamating plates in the manner well known in the art. Figure 2 illustrates another form of this type of amalgamating device, also equipped with means for utilizing the effects of acoustic wave agitation of the suspension and the amalgamating surface. Figures 3 and 4 illustrate the application of this invention to the centrifugal type of gold extraction device; and Figure 5 illustrates the application of acoustic waves to accelerate the reactions of the chemical extraction process generally described as the cyanide process.

In Figure 1, reference character 1 designates the copper plate bearing a layer 2 of mercury, above which is the aqueous suspension of finely ground ore, or pulp 3. Reference characters 4, 4 designate the framework supporting the amalgamating plate 1. As shown in Figure 1, the pulp is assumed to flow across the amalgamating plate in a direction perpendicular to the plane of the drawing, which is a cross-section of the amalgamating apparatus. Iron armatures 6 are provided attached to the lower side of the amalgamating plate by soldering, brazing, or in any other suitable manner. These armatures are acted upon by the fields produced by the loud speaking telephone receiver units 5. These units are supported in close proximity to the armatures by supporting member 7, and are energized by alternator 8. This results in a pulsating magnetic field which acts upon armatures 6, imparting a vibratory motion to amalgamating plate 1, whereby the mercury 2 and the pulp 3 are traversed by acoustic waves of the same frequency as that generated in alternator 8. It is this acoustic wave field which I have found effective in promoting amalgamation, particularly of the finer gold particles.

In order to assist in cleaning the mercury and to reduce the tendency of the mercury to flour, it is desirable to circulate a direct current through the pulp to the mercury as cathode in the manner well known in the art. This is accomplished by means of anodes 10, preferably of some non-oxidizable material, such as graphite, which are supported in contact with the pulp surface by brackets 11, and supplied with direct current from the positive terminal of battery 14, over conductor 13 and through ballast lamps 12. The negative pole of battery 14 is connected by means of conductor 15 to the amalgamating plate 1.

Figure 2 represents a cross-section also at right angles to the direction of flow of the pulp 18, over the mercury 17 carried by the amalgamating plate 16 which rests at the bottom of the shallow trough 24. In this case, however, the acoustic waves are applied to the upper surface of the pulp by means of the metallic diaphragm 19 attached to members 31, which in turn are attached to the upper edges of trough 24. This diaphragm has attached to its upper surface iron armatures 20 which coact with loud speaking telephone receiver units 21 to produce a vibratory motion of the diaphragm when the said loud speaking telephone units are energized from alternator 22.

In order to utilize the additional advantages of a flow of direct current through the pulp to the mercury as a cathode, the diaphragm 19 is also made to serve as an anode, being connected to the positive pole of battery 29 by means of terminal 25, conductor 26 and ballast lamp 28. Terminal 23 and conductor 27 connect the mercury 17 electrically to the negative pole of battery 29.

It will thus be apparent that the pulp in apparatus of the types illustrated in Figures 1 or 2 is subjected to the acoustic wave field resulting from the vibratory motion of amalgamating plate 1 in Figure 1, or of diaphragm 19 in Figure 2. The pulp is thus traversed by a system of longitudinal waves of compression and rarefaction, and the mercury-pulp interface at which amalgamation occurs is strongly agitated by such waves. It is necessary to so adjust the frequency and amplitude of alternator 8 or 22 that flouring of the mercury is avoided.

Upon the completion of a run, the amalgamating plates are removed and the mercury gold amalgam thereon is treated for the recovery of the gold in any of the well known manners, as by filtration through chamois, followed by distillation of the thus separated concentrated amalgam, and acid treatment of the resulting metallic residue. In Figure 1, removable details 9 must be taken out to permit the removal of the amalgam plate 1. In the form of apparatus shown in Figure 2, the details 31 are detachably mounted on the trough 24, and may be lifted off together with the diaphragm 19, loud speaker units 21, and their support 30, to permit removal of the mercury 17 and amalgam plate 16.

It is to be understood that the loud speaker units of the electromagnetic type shown in Figures 1 and 2 are capable of replacement by other suitable devices for the translation of alternating current electrical energy into reciprocating mechanical motion. I may also utilize for this purpose loud speaker units of the electrodynamic type, piezo-electric crystals or magnetostriction vibrators, the choice being determined by the frequencies employed. It is also to be understood that while I have shown the source of alternating current as an alternator, and have employed the conventional circuit symbol for this device, that I may employ a vacuum tube oscillator, an inverter utilizing electrical discharge tubes of the so-called thyratron type, or other suitable devices. It will furthermore be apparent that the battery shown as a source of direct current may be replaced by a generator converter or rectifier, as may be found convenient.

Figure 3 of the drawings illustrates a gold extraction apparatus of the centrifugal type. In this figure, reference character 32 indicates a housing of cast iron or other suitable material, provided with a removable top plate or cover 33 of similar material. A downspout or funnel 41, centrally located in this cover serves to conduct the ore pulp in a vertical stream into the rotating bowl 40 mounted within this housing.

This bowl is carried upon a vertical shaft 34, the upper end of which is rotatably mounted in a bearing 58, and the lower end of which extends through the bottom of housing 32, being supported at that point by bearing 59 and thrust bearing 59$^a$. At the lower end of the shaft is provided pulley 35, which is driven by belt 53 from a motor or engine not shown on the drawing.

The inner surface of the bowl is provided with a plurality of annular grooves 42 within which the mercury collects during rotation. Ore pulp entering at funnel 41 will, when the bowl is in rotation, flow outward and upward between the bowl and the stationary diaphragm 43, which has the form of the frustrum of a cone. This diaphragm is formed of suitable sheet metal and is supported from the top cover and downspout by insulating supports 44. The inner surface of this frustro-conical diaphragm member 43 is provided with iron armatures 45, so placed that they will coact with the loud speaking telephone receiver elements 46 to impart a vibratory motion to the member 43, when the said receiver elements 46 are energized from alternator 48.

The loud speaking telephone receiver elements 46 are mounted on a frustro-conical insulator 47, formed of Micarta or other suitable material, which is in turn attached to the surface of the downspout 41, which faces the diaphragm 43 and bowl 40. Conductors 49 and 52, passing through bushings 50 and 51 in top cover 33, connect the receiver elements 46 to the alternating current source 48.

It will thus be seen that when the pulp passes through the space between the diaphragm 43 and bowl 40, that it is subjected to an acoustic wave field, which aids mercury in the grooves 42 in entrapping and amalgamating with gold particles suspended in the said pulp. Since the diaphragm 43 is insulated from the bowl and its housing, it may also serve as anode of a direct current circuit, of which the bowl and the mercury are the cathode, in order to clean the mercury and further assist amalgamation in the well known manner. This is accomplished by conductor 53, which connects to the member 43, and passes through the cover 33 by means of bushing 54, through the lead 55, to ballast lamp 56 and the positive pole of battery 57. The negative pole of this battery is connected by conductor 58 to the brush 39, which bears on collector ring 38 mounted on the shaft 34. This construction avoids current flow through the bearings 58, 59, and 59$^a$. It will be apparent that the use of the diaphragm member 43 as the anode of the direct current circuit, ensures a uniform current distribution to the mercury cathodes in the grooves 42, which obviates a difficulty sometimes experienced in devices of this type, due to uneven current distribution, whereby lack of direct current flow to the upper grooves leads to the fouling and flouring of the mercury therein.

Figure 4 of the drawings illustrates a second type of centrifugal gold extraction apparatus arranged for the use of acoustic waves, but differing from that shown in Figure 3, in that the diaphragm member rotates with the bowl instead of being fixed. The same reference characters as in Figure 3 refer to those parts of the form of the device shown in Figure 4 which are substantially identical in form and function with the corresponding parts of Figure 3. The principal difference between these two embodiments of the invention lies in the frustro-conical diaphragm member 66, which is supported from the inner surface of bowl 40 by insulators 65, and rotates therewith. The inner surface of the diaphragm member 66 is provided with iron armature members 67, which coact with the loud speaking telephone receiver elements 68 to produce a vibratory motion of the diaphragm 66, when the receiver elements 68 are electrically energized from alternator 78, by a circuit over conductor 77 to the insulated brush holder 61 to collector ring 63, and thence through wiring not shown in the drawings, to the receiver elements 68, and thence to the bowl 40 by a ground connection also not visible in the drawings. The other terminal of the alternator 78 is connected to the frame of the machine by conductor 72, and the grounded brush holder 39. Conductor 73, connected to conductor 72, also connects to the negative pole of battery 74. The positive pole of this source of direct current is connected through ballast lamp 75 to conductor 76, and thereby to the insulated brush holder 62. The brush in the brush holder 62 engages collector ring 63a, which is metallically connected to diaphragm 66, whereby the said diaphragm becomes the anode of a direct current circuit through the ore pulp, of which the bowl 40 and the mercury in the annular grooves 42 is the cathode. This assists in cleaning the mercury and in preventing flouring, as has been previously described.

It will be apparent that ore pulp entering through the downspout 41 of the form of the invention shown in either Figure 3 or Figure 4 will pass to the bottom of the rotating bowl 40, and will be caused by centrifugal force to pass upwards and out over the inner face of the bowl 40, and fill completely the space between the said bowl and the diaphragms 43 or 66, flowing out over the top of the bowl and out of the housing through spout 60. In Figure 4, the baffle members 70, 71, and 79 are provided to keep the ore pulp out of the space inside diaphragm 66, and away from the brush holders 61 and 62.

Figure 5 shows in cross-section a tank 80, containing the ore pulp mixed with potassium cyanide solution. Compressed air at a low pressure is blown in through pipe 81, and bubbles up through the contents of the tank, through the perforated portion 82 of tube 81. A plurality of magnetostriction vibrators 83 are supported in the fluid by member 82. These vibrators consist of nickel tubes, the upper portions of which are slotted, as indicated at 85, and are set in vibration by the passage of an alternating current through coils 84. The frequency of this alternating current should preferably be near the mechanical frequency of resonance of the tube for a longitudinal vibration. The coils 84 are connected in series and to conductors 87 and 88, which in turn connect to the secondary of the transformer 89, through condenser 86. This condenser is made of such value as to resonate the circuit electrically. The primary of the transformer 89 is connected to the alternating current source 90.

The acoustic wave agitation of the pulp is found to result in a substantial increase in the reaction velocity. The same arrangement, but without pipe 81, may also be used to advantage in connection with the subsequent precipitation of the gold from the cyanide solution by zinc dust.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. In a device for the recovery of gold or other noble metals in dispersed phase: an amalgamating surface bearing mercury; a source of alternating current; means for the conversion of said alternating current into mechanical wave motion; means for causing the propagation of said wave motion as waves of compression and rarefaction through a fluid suspension of said metals in dispersed phase, said means being in contact with said fluid suspension at a point removed from said amalgamating surface; a source of direct current; and means for causing the passage of a direct current from said source to the mercury as cathode.

2. In a device for the recovery of gold or other noble metals in dispersed phase in a fluid suspension: an amalgamating surface bearing mercury; a source of alternating current; a diaphragm contacting said fluid suspension at a point removed from said amalgamating surface; and means for the conversion of said alternating current into mechanical vibration of said diaphragm, whereby waves of compression and rarefaction are propagated through said fluid suspension toward said amalgamating surface.

CHARLES REVELL HOLDEN.